July 23, 1968 P. H. WALKER 3,394,342
ULTRASONIC OBJECT DETECTION SYSTEMS
Filed Sept. 13, 1965 3 Sheets-Sheet 3
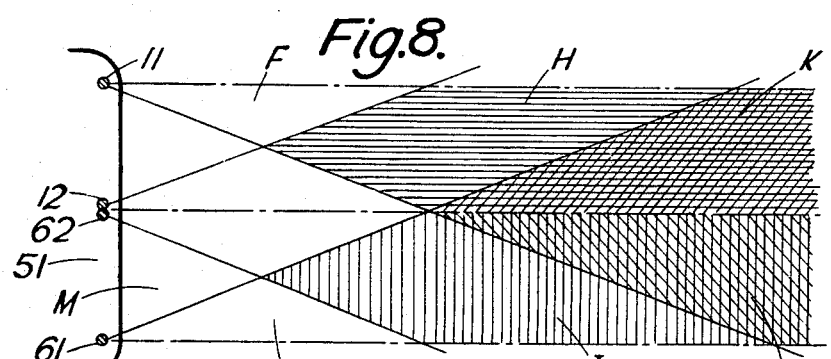
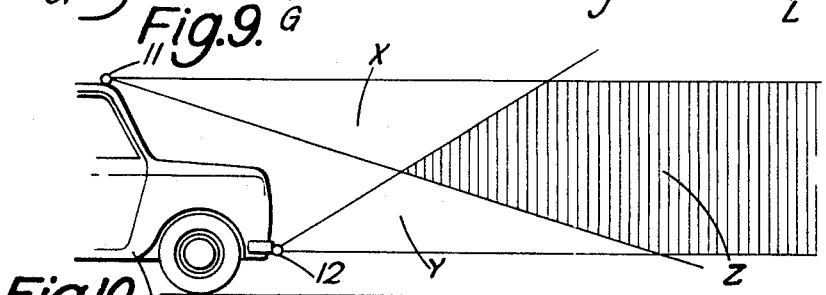
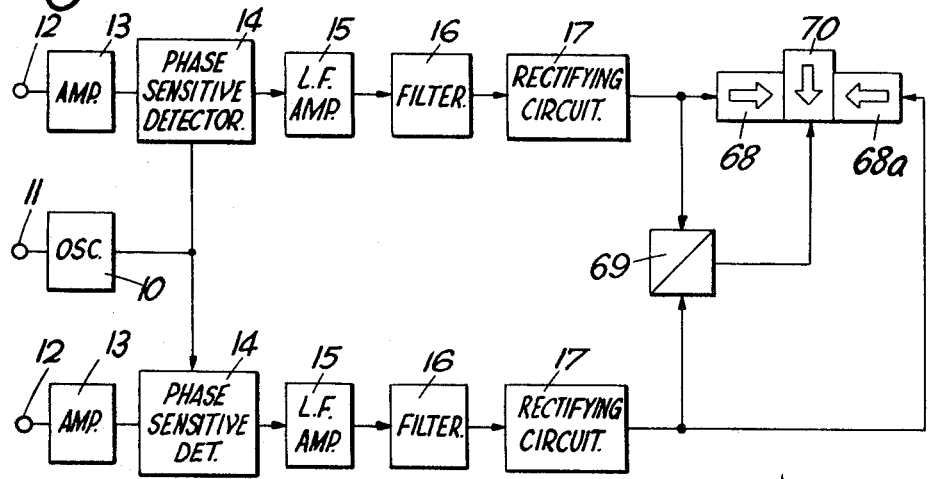
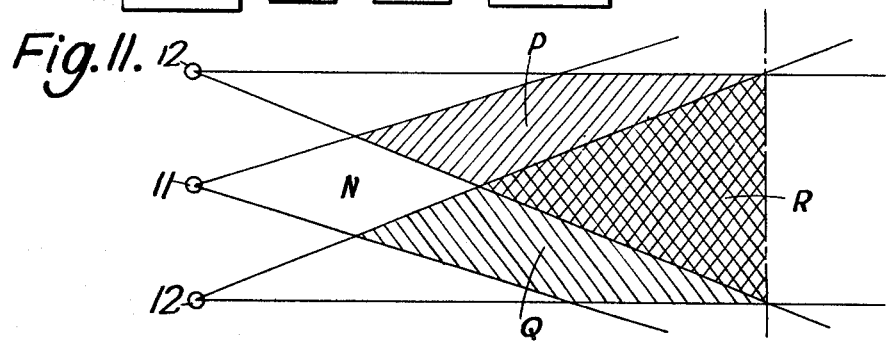

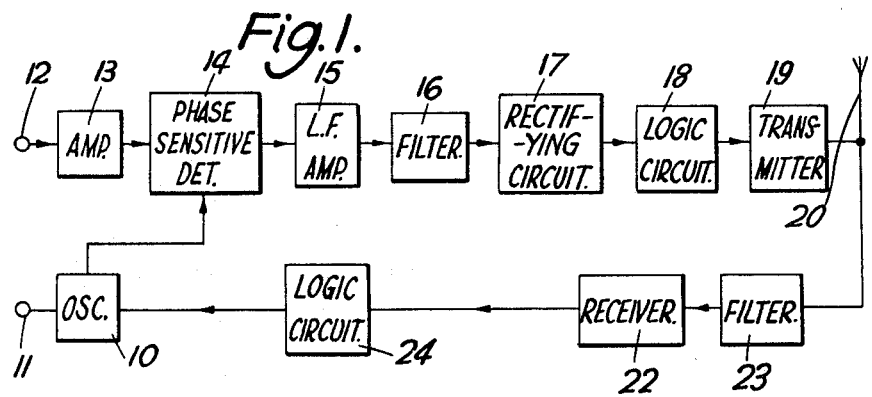
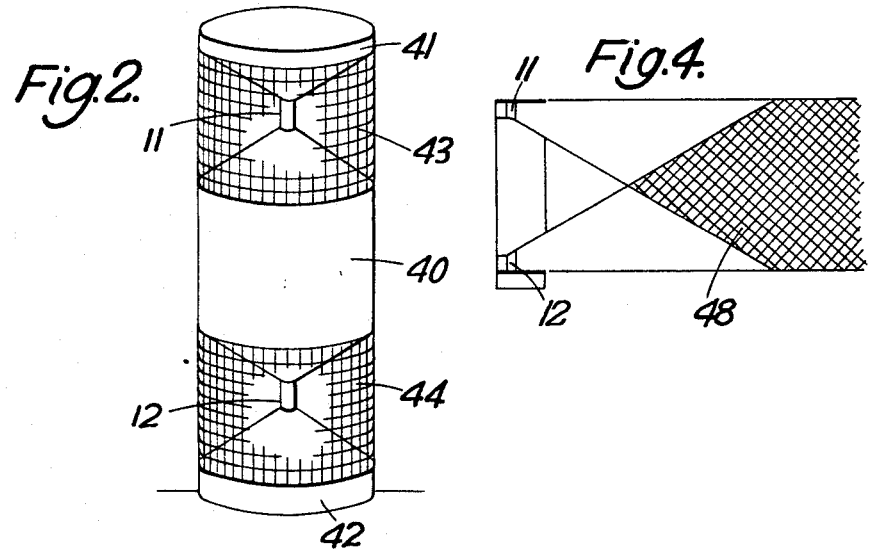
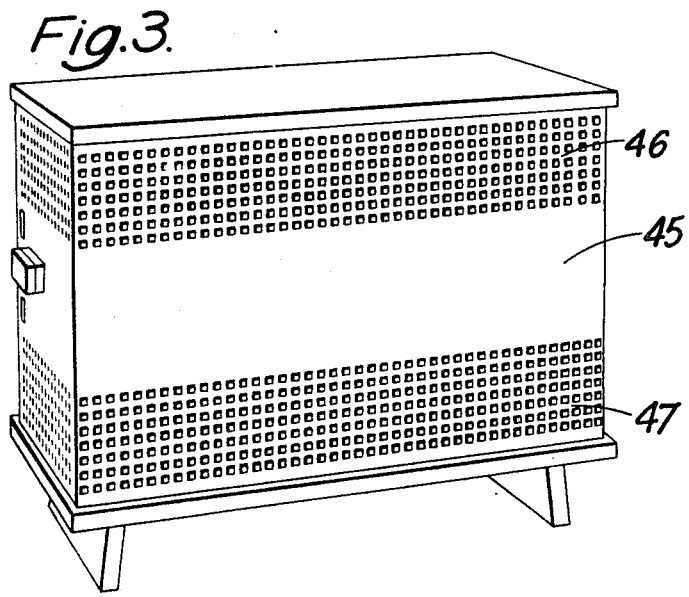

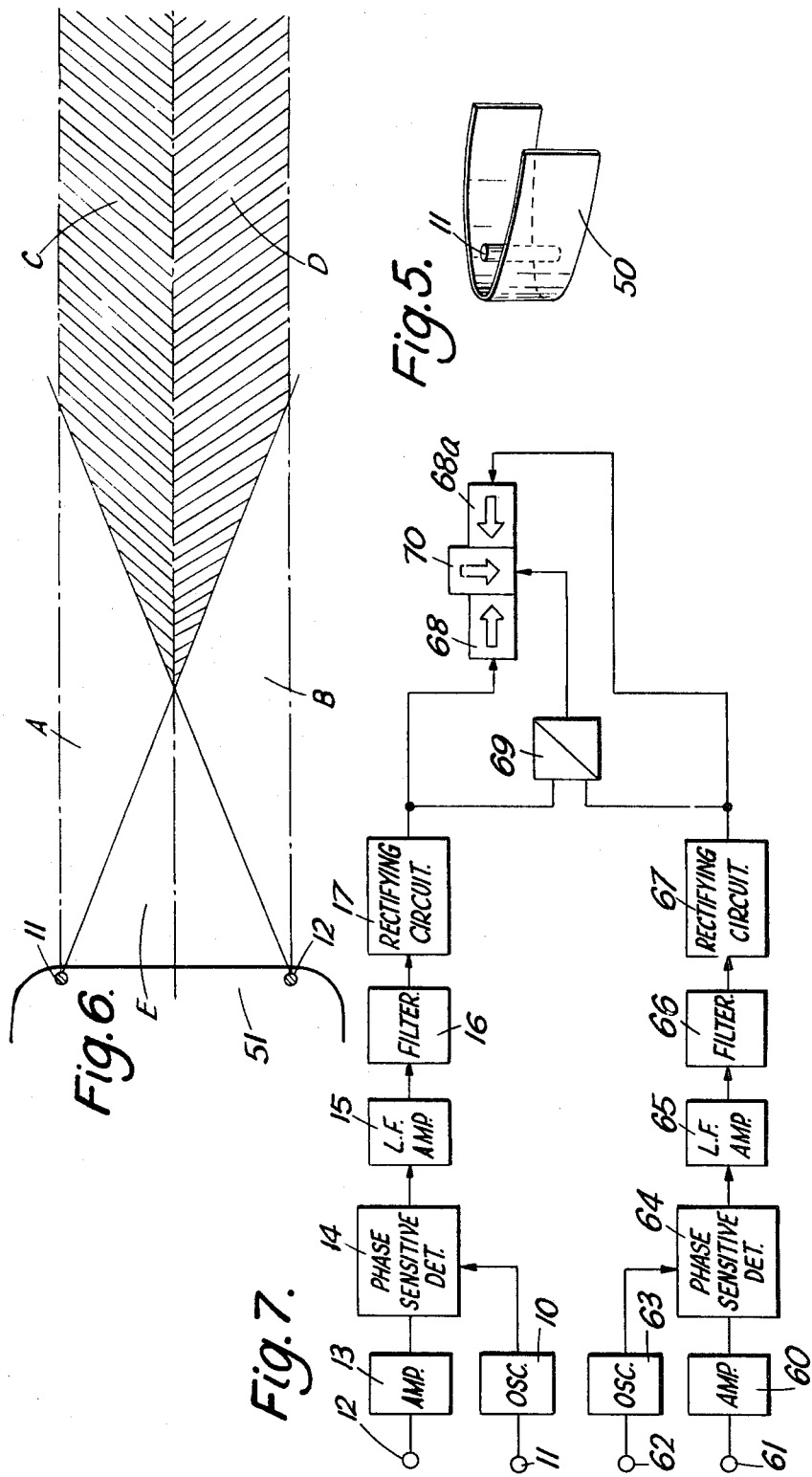

United States Patent Office 3,394,342
Patented July 23, 1968

3,394,342
ULTRASONIC OBJECT DETECTION SYSTEMS
Philip Hulme Walker, Decca House 9, Albert
Embankment, London, England
Filed Sept. 13, 1965, Ser. No. 486,687
11 Claims. (Cl. 340—1)

ABSTRACT OF THE DISCLOSURE

An ultrasonic object detection system in which improved discrimination against spurious effects is achieved by a combination of discrimination against static objects by providing for detection of change in phase relationship between signals radiated to and received from a detected object, and discrimination against small insignificant objects close to transmitter or receiver, by providing shaped transmitter and receiver radiation patterns which intersect only in a region remote from transmitter and transducer. Embodiments suitable for intruder detection and vehicle collision warning are described.

---

This invention relates to detection systems for detecting an object moving relatively to the system.

It is an object of the present invention to provide an improved form of ultrasonic detection system.

More particularly it is an object of the invention to provide an intruder alarm system which is not dependent on maintaining, as in prior ultrasonic alarm systems, a fixed standing wave pattern. By avoiding this limitation of prior types of such systems, it becomes possible to make a portable intruder alarm.

Furthermore it is possible to use the detection system of the present invention on a moving vehicle, for example as a collision warning system.

According to this invention, a detection system for detecting an object moving relatively to the system comprises a transmitter and a receiver of ultrasonic radiation together with indicating means fed from the receiver and responsive to signals from relatively moving targets, the transmitter and receiver being spaced apart with the transmitter radiating a directional beam and the receiver receiving with a directional beam, the two beams being arranged to intersect one another only in the region where objects are to be detected.

In an ultrasonic intruder detection system false indications are often a serious problem. One cause of such indications heretofore has been that movements of the transmitting medium, that is to say, the air in a system for detecting a moving person, result in a static target giving an indication apparently from a moving target. With the arrangement of the present invention the transmitter and receiver are spaced apart and have directional radiation patterns and the system is responsive only to targets in the region where the directional transmitting and receiving beams intersect. By ensuring that there are no static targets in this region, then false alarms arising from such static targets due to movement of the transmitting medium are avoided.

In one arrangement for a moving person detection system, the transmitter and receiver are spaced apart in a vertical plane and are arranged to radiate fan-shaped beams giving a relatively broad beam width in a horizontal plane but a much narrower beam width in the vertical plane. The two beams are directed at slightly different angles in the vertical plane so as to intersect in the region where moving targets are to be detected. As described above, they are arranged to intersect in a region where there is normally no static target. At least in the effective area of operation the two beams have their lower edges clear of the ground. It may often be required that the beams should be sufficiently far above the ground to avoid the apparatus being set in operation by small animals such as rats or mice. The effective area of operation would usually have inner and outer limits defined by the intersection pattern of the beams but the beams might be arranged so that the maximum range of operation is limited by the transmitted power and receiver sensitivity. Conveniently the lower beam is arranged to have its lower edge approximately parallel with the ground and the upper beam is directed slightly downwardly to intersect the lower beam in the required region. Preferably the two beams in the horizontal plane extend over substantially the same angular spread.

Preferably the transmitting and receiving beams are arranged so that the nearest point of intersection of the two beams is an appreciable distance away from the transmitter and receiver. This further assists in minimizing the possibility of false alarms due to the turbulence in the neighborhood of the transmitter and receiver. The making of the nearest point of intersection of the beam at an appreciable distance from the transmitter and receiver has a further important advantage in outdoor systems where it may be necessary to avoid the possibility of any false indications being given from precipitation such as rain, hail or snow. In such cases it is desirable to avoid the beams intersecting in the most highly sensitive region close to the transmitter and receiver and to ensure that the volume of the region where the beams intersect, that is to say, the volume of the precipitation which can give responses, is sufficiently small that the responses from precipitation do not give a false alarm on the indicating means.

As previously indicated, the invention is applicable also to collision warning systems to be carried on a vehicle, e.g. a road vehicle. Such apparatus must detect the presence of an obstruction, e.g. a stationary vehicle, ahead of the vehicle carrying the apparatus yet it must avoid giving any false warning, for example from lamp-posts beside the road or the piers of a bridge across the road, or from the bridge itself.

Thus, according to another aspect of this invention, collision warning apparatus on a vehicle comprises an ultrasonic detection system with directional transmitting and receiving transducers spaced apart across the width of the vehicle, each transducer being arranged to provide a directional beam with the directional beams on the two sides of the vehicle having their axes intersecting ahead of the vehicle, each beam being shaped and directed so that the beams overlap only in the region where obstacles are to be detected and means for energizing the transmitting transducer to radiate ultrasonic signals and indicating means responsive when echoes of the radiated signals are received by the receiving transducer. Ultrasonic detection systems have a limited range dependent on the radiated power, the sensitivity of the receiving system and the attenuation of the transmitting medium and it is readily possible to ensure that signals reflected by distant objects, where the beams might be widespread transversely, are negligible. In the simplest case, a single transmitting transducer and a single receiving transducer are employed, one on each side of the vehicle with their beams directed at angles such that the outer edges of the beams (i.e. the near-side edge of the beams for the near-side transducer and the off-side edge of the beams for the off-side transducer) extend in directions parallel to the axis of the vehicle.

Preferably the transducers are spaced as widely apart as possible across the front of the vehicle. It will be seen that warning is given only when objects are detected in the region where the two beam patterns overlap. Each transducer is arranged to direct its beams across the front of the vehicle at such an angle that the near-side transducers prevents any detection of objects to the near side of a line extending forwardly along the near side of the vehicle and the off-side transducer prevents any detection of objects to the off-side of a line extending forwardly along the off-side of the vehicle. Thus the only objects for which warning is given must be in the region ahead of the vehicle.

As will be explained in further detail with reference to specific examples, further advantages are obtained by using two systems on the vehicle with separate receiving channels and correlating the information.

In the following description, reference will be made to the accompanying drawings in which:

FIGURE 1 is a block diagram illustrating ultrasonic moving object detecting systems;

FIGURE 2 is a perspective view of the transducer and transmitter aerial assembly and the housing;

FIGURE 3 is a perspective view of another intruder alarm;

FIGURE 4 is a diagram illustrating the radiation pattern employed in an intruder alarm;

FIGURE 5 is a perspective view of a radiating or receiving transducer for a collision warning system on a vehicle;

FIGURE 6 is a diagram illustrating the radiation pattern employed in a collision warning system;

FIGURE 7 is a block diagram of a collision warning system for a vehicle;

FIGURES 8 and 9 are diagrams illustrating the radiation pattern employed with the system of FIGURE 7;

FIGURE 10 is a block diagram of another collision warning system; and

FIGURE 11 is a diagram illustrating the radiation pattern employed in the system of FIGURE 10.

FIGURE 1 illustrates an intruder alarm for detecting the presence of an intruder within a selected area, for example in a part of a room. The particular embodiment to be described is a battery operated portable unit. Referring firstly to FIGURE 1, a transmitter comprises a battery powered transistor oscillator 10 producing a continuous wave signal of ultrasonic frequency, typically 70 kilocycles, which is fed to a piezo-electric transducer 11 for radiating ultrasonic signals. Echoes of these signals are picked up by a second piezo-electric transducer 12 and fed to an amplifier 13 and thence in this particular embodiment to a phase sensitive detector 14 which provides an output dependent on the phase relationship between the received signals and a reference signal which is fed from the oscillator 10 to the phase sensitive detector. In this particular embodiment of the invention, there is conveniently employed a phase sensitive detector means switched on and off for alternate half cycles by the reference signal to give an output dependent on the phase relation between the received signals and the reference signal and a filter network to pass low frequency variations in this output signal which variations arise when responses are received from moving targets. Such a detector has the advantage that the relative amplitudes of the received and reference signals are not critical; provided the received signals are of sufficient amplitude that the switchable means (typically a transistor) is driven into a limiting condition rectangular pulses are formed which will in effect be pulse width and polarity modulated, the particular modulation representing the required phase. For purposes of the present invention, it is also possible to use a frequency sensitive detecting system which is responsive to the frequency relationship between the received signals and the radiated signal so that due to the Doppler effect the received signal from a moving target differs in frequency from radiated signals and hence responses to moving targets may be distinguished from responses from static targets by frequency sensitive detecting system.

With the phase sensitive detecting system of FIGURE 1, the output from the detctor 14 is fed to a low frequency amplifier 15 which amplifies low frequency variations in the output of the detector due to movement of a target. The signal from the low frequency amplifier 15 is passed through a high frequency rejection filter 16 arranged to remove any components at the ultrasonic radiation frequency and thence to a rectifying circuit 17 which gives a direct current output pulse only when a low frequency component is received from the sensing assembly, that is to say when the output from the phase sensitive detector is changing. The output from the rectifying circuit 17 is fed to an electrical logic circut 18 arranged to pass signals from the rectifying unit only when the signals indicate for a period of time the presence of a moving target. The logic unit might comprise a storage device to store the signals with means for periodically sampling the stored signal for example every half second and a correlation circuit giving an output only when a received signal and a sampled stored signal occur simultaneously. Alternatively, the logic circuit may comprise an integrating circuit arranged to integrate successive output pulses from the rectifier and to pass on signal representative of the presence of a moving target only if the sum total reaches a predetermined value the integrator being arranged to be reset after a pre-selected time. The output from the logic circuit is to be transmitted to a distant point and conveniently the rectified pulse triggers a battery operated radio transmitter 19 to radiate a signal from an aerial 20.

With the portable moving object detecting apparatus which has been described so far, it is necessary to provide means whereby the system can be inhibited from operating when for example; the operator wishes to service it or set it up in a different location. One arrangement for achieving this would be to provide a time switch arranged to switch the transmitter 10 on and off for predetermined times. Another arrangement, shown in FIGURE 1, is to use a receiver 22 coupled to the output of the aerial 20 and arranged to decode an amplitude modulated radio frequency, different from that radiated by the antenna 20. A filter 23 is provided to select the required frequency. The receiver 22 provides a coded pulse output which is fed to a logic circuit 24 comprising a series of serially operated gates which switch the transmitter on or off according to the particular signal which has been decoded. Accordingly, this apparatus can be used repetitively and controlled remotely from the distant point by merely providing the appropriately coded radio frequency signals.

FIGURE 2 shows the housing which includes a conically ended cylindrical container 40 containing the apparatus, apart from the transducers 11 and 12, shown in FIGURE 1, the container 40 constituting the aerial 20 for the transmission of the alarm signal to the distant point. The two transducers 11 and 12 are arranged vertically, one at each end of the housing, which thereby constitutes a baffle between the transmitter and receiver, conical end pieces 41 and 42 helping to shape the beams in the vertical plane. Cylindrical grilles 43 and 44 surrounding the transducers 11 and 12 provide further support for the housing 40 and end piece 41 on the lower end piece 42.

FIGURE 3 illustrates another construction of unit for housing the transmitting and receiving transducers. In FIGURE 3 a housing 45 has two grilles 46, 47 behind which the respective transducers are located. A unit shown in FIGURE 3 may conveniently be operated from an electric supply means and an electrical connector provided from the unit to a distant indicator or alarm. In such a case, the circuit for the alarm would be arranged so that the alarm operates if this connector is cut.

FIGURE 4 illustrates diagrammatically the radiation pattern of the two transducers of an intruder detection such as that of FIGURE 2 or FIGURE 3. A moving object will only be detected if it is in the shaded area 48. With the construction of FIGURE 2, it is readily possible to make the beams fan shaped in the horizontal plane. The horizontal coverage of the two beams is made the same but, as shown in FIGURE 4, the vertical directional patterns are arranged so that there is a limited detecting region above the ground and spaced away from the immediate vicinity of the transducers.

As previously explained, the invention is also applicable to apparatus for use on a vehicle, e.g. an automobile for detecting objects moving relatively to the vehicle and may be used for example for giving warning of the risk of collision in fog.

In the simplest form, the two transducers 11, 12 of FIGURE 1 may be spaced apart across the width of the vehicle. Each transducer conveniently comprises a cylindrical piezo-electric transducer arranged in a cylindrical parobolic reflector 50 as illustrated in FIGURE 5. The frequency employed may typically be of the order of 60 or 70 kc./s. and at this frequency the cylindrical piezo-electric element will tend to obey the same aperture laws as do microwave antenna operating in the millimetric region and consequently the reflector may be arranged to shape the beams so that in the horizontal plane the aperture of beam is only a few degree whereas the small wave length of the transmitted signals will if the piezo-electric element is held upright ensure that the beam width is only a few degrees in the vertical plane. FIGURE 6, which is not to scale, shows the radiation pattern which is preferred for such a collision warning system in which the transducers are spaced apart across the front of the vehicle 51, the transmitting transducer having a beam which is directed so that the outside edge is substantially parallel to the axis of the vehicle and the receiving beam being directed so that its outside edge is parallel to the axis of the vehicle group also. With the system shown in FIGURE 6, signals will only be received from targets in the area where the two beams overlap and consequently targets in areas A and B, the most sensitive areas of the radiation pattern, will not produce output responses. This feature enables the system to be unresponsive to small particles, for example raindrops, in the most sensitive volume of the transducer beams. Signals in the areas C and D however will be in the path of both the transmitter and receiving transducer beams and will therefore produce an output from the system provided that the object is moving relatively to the radiated signals. Targets laterally located outside the parallel lines bounding areas C and D will not be detected by the system and therefore vehicles to either side of the vehicle 51 will not produce a response in the system. This insures that vehicles on an opposite side of the road to the vehicle 51 will not produce a response in the detecting system.

In some cases, it may be preferable to employ a baffle between the transmitting and receiving transducers and arranged to extend forwardly in a plane normal to the line between the transducers; such a baffle helps to avoid any direct coupling between the transmitter and receiver through the air and thus helps to prevent the possibility of a false alarm due to turbulence in such a direct coupling path through the air.

For this collision warning system, the output from the rectifying circuit 17 is conveniently fed directly to a display unit having an illuminated arrow or other sign which is lighted up only when an output pulse is received from the rectifying circuit 17. The display unit is conveniently located for viewing by the driver of the vehicle.

FIGURE 7 shows a further embodiment of the detecting system in which a second receiving channel is constituted by the units 60 to 67 in which an oscillator 63 transmits ultrasonic signals, which may be of a frequency different to that transmitted by transmitter 10 to a transducer 62, echoes received by transducer 61 being fed to an amplifier 60 and thence to a phase sensitive detector 64 producing an output which is fed to a low frequency amplifier 65, to a high pass rejection circuit 66 and to a rectifier 67. The output from rectifier 17 is fed to a first display unit 68 and the output from the rectifier 27 is fed to a second display unit 68a. The outputs from rectifiers 17 and 67 are also fed to two inputs of a gate 69 arranged so that if an output appears at the two receiving channels simultaneously, a display unit 70 also indicates.

Before describing the operation of this circuit, further reference will be had to FIGURE 8 showing a typical radiation pattern for use with this circuit. The transmitter 11 and receiver 12 are arranged to be spaced apart across one half typically the off side half of the vehicle and the transducers 61 and 62 to be spaced apart across the other half of the vehicle. The radiation patterns of the two systems are similar arranged to be symmetrical about the axis of the vehicle. In FIGURE 8, objects in the areas F and G, the most sensitive area of the radiating beams will not be detected by a receiving transducer. An object however in areas H or K formed by the overlapping beams pertaining to the transmitter 11 and the receiver 12 will produce an output in the first receiving channel whereas an object in the areas J or L will produce in the second receiving channel. Furthermore, an object large enough to be in both areas K and L will produce an output in both channels. Referring again to FIGURE 7 therefore an object in area H will produce an output on display unit 68 so that the illuminated arrow may indicate the presence of an object on the off side whereas an echo detected by the other receiving channel will cause the arrow on display unit 68a to indicate the presence of the object on the near side of the vehicle. Finally, if an echo signal is received on both channels simultaneously, indicating the presence of a moving object in area K and L, an output will occur at gate 69 so that a display unit 70 will be illuminated. FIGURE 9 shows the preferred location of the transmitter and the receiver units on the vehicle in the vertical plane. It will be seen that they are spaced apart and arranged so that the upper beam X is directed downwardly from the horizontal whereas the lower beam Y is directed upwardly so that not only are responses not received from overhead targets such as bridges but also echoes are not received from for example the road, echoes only being received from the region Z.

FIGURE 10 shows a further embodiment of this invention in which a single transmitter, and two receiving transducers are employed, the two receiving channels being identical with the channel shown in FIGURE 1. For convenience the same reference numerals are used for the two channels. The radiation pattern for the transmitter and receiving transducers which is suitable for this arrangement is shown in FIGURE 11 in which objects in areas N in front of the transmitting transducer will not be received by either of the receiving transducers whereas objects in areas P and Q will be received by one channel only and objects in area R may be received on both channels. It is therefore possible to use a display system similar to that used in FIGURE 7, the outputs of rectifiers 17 being fed to the display units 68 and 68a and through gate 69 to display unit 70 as in FIGURE 7. With this system echoes will also be received from the areas outside the forward parallel beam and it would be necessary using this system, to ensure that the range of the transmitter were limited so that these echo signals would not produce an output response.

In the systems described above, continuous wave operation has been more particularly described but it would also be possible to use pulse signals so that an indication of range could be obtained. However the low velocity of propagation of sound is such that unless the range of the detection system were severely limited, the pulse repetition frequency may have to be very slow in order to limit the possibility of receiving multiple time around echoes which would make the determination of range ambiguous. Preferably therefore, a continuous wave radiation is employed and a phase sensitive detection system employed responsive to the changes in phase of the received signal with respect to the transmitted signal to give an indication of relatively moving targets. With a phase sensitive detection system, it is usually immaterial if there is any breakthrough from the transmitter to the receiver and, in fact, such breakthrough signals may be employed in the receiver as the phase reference standard.

I claim:
1. A detection system on a vehicle for giving collision warning, comprising an ultrasonic detection system with directional transmitting and receiving transducers spaced apart across the width of the vehicle, each transducer being arranged to provide a directional beam with the directional beams on the two sides of the vehicle having their axes intersecting ahead of the vehicle, each beam being shaped and directed so that the beams overlap only in the region where obstacles are to be detected, means for energizing the transmitting transducer to radiate ultrasonic signals, means responsive to a change in the phase relation between a received signal and the transmitted signals to give an electrical output indicative of the presence of an obstacle moving relatively to said vehicle in said region, and indicating means responsive to said electrical output.

2. A detection system as claimed in claim 1 wherein a single transmitting transducer and a single receiving transducer are employed, one on each side of the vehicle with their beams directed at angles such that the outer edges of the beams (that is to say the near side edges of the beam for the near side transmitter and the off side edge of the beam for the off side transducer) extend in directions substantially parallel to the axis of the vehicle.

3. A detection system as claimed in claim 1 wherein two receiving transducers are employed, one to each side of the vehicle, with the transmitting transducer between them, the near side receiving beam having its near side edge substantially parallel to the axis of the vehicle and the off side receiving beam having its off side edge substantially parallel to the axis of the vehicle and the system being arranged so that the maximum range of detection does not extend beyond the range where each receiving beam spreads out beyond the opposite side of the vehicle.

4. A detection system as claimed in claim 1 wherein two transmitting transducers and two receiving transducers are employed, each receiving transducer being spaced from its associated transmitting transducer and arranged to give warning of obstacles in the region ahead of the vehicle bounded by substantially parallel lines through the transmitting and receiving transducers.

5. A detection system as claimed in claim 4 wherein the two receiving transducers are arranged centrally on the front of the vehicle with a transmitting transducer spaced therefrom on either side.

6. A detection system as claimed in claim 4 wherein the two transmitting transducers are arranged centrally on the fronting of the vehicle with the receiving transducers spaced therefrom on either side.

7. A detection system as claimed in claim 4 wherein the two systems operate on different frequencies with each pair of transducers arranged to give a parallel forward beam.

8. A detection system as claimed in claim 4 wherein the beams are made directional in the vertical plane and directed upwardly sufficiently to avoid obtaining reflections from the road surface ahead of the vehicle.

9. A detection system as claimed in claim 8 wherein the receiving transducers are arranged at a different level to the transmitting transducers, each lower transducer having a beam directed upwardly to have the lower edges clear of the road surface and each upper transducer having a beam directed downwardly to be clear of the overhead bridges.

10. A detection system as claimed in claim 1 wherein the transducers comprise cylindrical piezo-electric elements arranged in cylindrical parabolic reflectors so that a narrow beam width is produced in two orthogonal planes of radiation.

11. A moving object detection system comprising a signal generator generating signals of ultrasonic frequency, a first transducer energised by said generator and arranged to radiate ultrasonic signals, a second transducer for receiving echoes of said ultrasonic signals, means responsive to the difference of phase between a received signal and the transmitted signals to give an electrical output indicative of the presence of a moving object and means for transmitting said electrical output to a distant point, wherein said first and second transducers are spaced apart in the vertical plane and are each arranged to provide a beam with a relatively narrow beam width in the vertical plane and a relatively broad beam width in the horizontal plane, the two beams being arranged to intersect only in the region where objects are to be detected.

References Cited
UNITED STATES PATENTS

| | | | |
|---|---|---|---|
| 2,974,304 | 3/1961 | Nordlund | 340—1 X |
| 2,982,955 | 5/1961 | Enenstein | 343—7.7 |
| 2,985,018 | 5/1961 | Williams | 340—1 X |
| 3,031,644 | 4/1962 | Hisserich et al. | 340—1 X |
| 3,149,561 | 9/1964 | Lancaster | 340—1 X |
| 3,192,516 | 6/1965 | Simpkins et al. | 340—224 X |
| 3,234,502 | 2/1966 | Sicuranza | 340—1 |
| 3,283,292 | 11/1966 | Kay | 340—1 |

OTHER REFERENCES

Witcher et al., Electronics, December 1954, pp. 136, 137.

RICHARD A. FARLEY, *Primary Examiner.*